United States Patent [19]

Greene et al.

[11] Patent Number: 4,810,770

[45] Date of Patent: Mar. 7, 1989

[54] ELASTOMERS

[75] Inventors: Robin N. Greene; Garret D. Figuly, both of Wilmington, Del.

[73] Assignee: E. I. Du Pont de Nemours and Company, Wilmington, Del.

[21] Appl. No.: 109,764

[22] Filed: Oct. 23, 1987

Related U.S. Application Data

[63] Continuation-in-part of Ser. No. 929,087, Nov. 10, 1986, Pat. No. 4,731,435.

[51] Int. Cl.$^4$ .................. C08G 69/44; C08G 73/16
[52] U.S. Cl. .................................. 528/289; 525/425; 525/432; 528/274; 528/288
[58] Field of Search ............... 528/274, 289, 288; 525/425, 432

[56] References Cited

U.S. PATENT DOCUMENTS

| | | | |
|---|---|---|---|
| 4,205,158 | 5/1980 | Hoeschele | 528/300 |
| 4,371,692 | 2/1983 | Wolfe | 528/289 |
| 4,371,693 | 2/1983 | Wolfe | 528/292 |
| 4,436,896 | 3/1984 | Okamoto et al. | 156/332 |
| 4,438,240 | 3/1984 | Tanaka et al. | 525/420 |
| 4,467,595 | 8/1984 | Kramers | 57/225 |
| 4,544,734 | 10/1985 | McCready | 528/288 |
| 4,556,688 | 12/1985 | McCready et al. | 525/33 |
| 4,556,705 | 12/1985 | McCready | 528/289 |
| 4,565,849 | 1/1986 | Horikawa et al. | 525/420 |

FOREIGN PATENT DOCUMENTS

| | | |
|---|---|---|
| 8419054 | 2/1985 | European Pat. Off. . |
| 4420477 | 9/1969 | Japan . |
| 44-20478 | 9/1969 | Japan . |
| 44-30751 | 12/1969 | Japan . |
| 45-2193 | 1/1970 | Japan . |
| 45-2192 | 1/1970 | Japan . |
| 45-9193 | 4/1970 | Japan . |

OTHER PUBLICATIONS

Makromol Chem. 179, 1955–59 (1978).

Primary Examiner—Veronica P. Hoke

[57] ABSTRACT

Elastomers are prepared from high molecular weight relatively rigid difunctional compounds and low molecular weight compounds selected from diacids, diols, diamines, hydroxyacids, hydroxyamines and aminoacids.

18 Claims, No Drawings

ELASTOMERS

This application is a continuation-in-part of application Ser. No. 929,087, filed Nov. 10, 1986, now U.S. Pat. No. 4,731,435.

BACKGROUND OF THE INVENTION

1. Field of the Invention

This invention provides novel elastomeric polymers from certain high molecular weight relatively rigid difunctional compounds and certain low molecular weight difunctional compounds. These elastomers are useful for fibers, films or molded products.

2. Description of the Prior Art

It is known from the prior art to produce elastomers by polycondensation of diesters of high molecular weight relatively rigid dicarboxylic acids with poly(alkylene oxide) glycol in substantially equimolar proportions. The present invention permits one to avoid the use of presynthesized macrodiol and to limit the amount of the expensive high molecular weight and relatively rigid component required to obtain elastomeric properties.

SUMMARY OF THE INVENTION

This invention provides an elastomer consisting essentially of

A. 5 to 25 weight percent of —X— units where —X— is part of a repeat unit having the structural formula $$-Y-X-Z-$$

where —Y— and —Z— are independently selected from

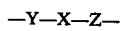

—X— is a divalent organic radical consisting of a chain of ring structures except for trans-amide, carbonyl, trans-vinylene, azo (i.e., —N=N—) and azomethine (i.e., —HC=N—) linkages which may be present and whose shortest length between centers of its terminal junctions measured from a Dreiding model laid flat is at least 11 Angstroms; and when —X— is in the compound:

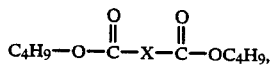

the compound exhibits a melting point that is at least about 225° C.; and

B. at least 75 weight percent of units selected from the following

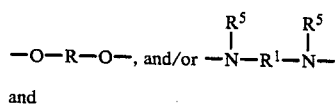

and

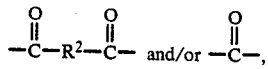

in which both free bonds are connected to oxygen and/or nitrogen, and/or

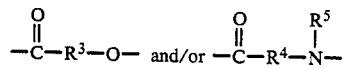

and an effective amount of

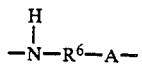

wherein

R, $R^1$, $R^2$, $R^3$, and $R^4$ are each aliphatic divalent organic radicals, having from 2 to 15 carbon atoms within the chain, with each having a molecular weight of under 450, $R^5$ is a hydrocarbon radical, $R^6$ a divalent aliphatic or cycloaliphatic radical having 1 to 15 carbon atoms, or a divalent aromatic radical containing 1, 2 or 3 six-membered rings, the rings being non-substituted or substituted with monovalent or divalent alkyl radicals having 1 to 4 carbon atoms, provided that when the alkyl is divalent, one of the valencies is connected to the —NH— radical or to the —A— radical, and —A— is

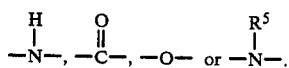

Usually, the d. units amount to 1 to 15% by weight of the polymer. It will be understood, of course, that the polymer must be balanced stoichiometrically. The invention also includes fibers, films, or molded articles from the polymers and processes for manufacture of the polymers.

DETAILED DESCRIPTION OF THE INVENTION

The novel polymer of this invention is an elastomer. By this is meant a polymer which, free of diluents, retracts to less than 1.5 times its original length within one minute after being stretched at room temperature to twice its length and held for one minute before release. This definition corresponds to that given in "ASTM D1566-83a" for a modified rubber. Polymers of the invention are useful in a number of end use applications. Hot melt adhesives, tubing and injection moldings and melt-spun elastic fibers are among such uses. The polymer should preferably have an inherent viscosity of at least 0.55 dL/g when measured as described below.

The polymer is basically comprised of two components, a "hard" segment and a "soft" segment. The "hard" segment corresponds to —X— in units having the formula —Y—X—Z—, the —X— units being present in the polymer in an amount of from about 5 to 25% by weight. The groups —Y— and —Z— are independently selected from

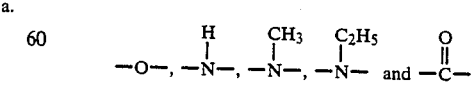

and are attached directly to —X—, or may be separated therefrom by spacer groups (not part of —X—) such as one or more methylene groups. The symbol —X— is a divalent radical whose shortest length between centers of its terminal junctions is at least 11 Angstroms as measured flat, or as flat as can be, with "Dreiding Models" which are constructed to be in precise scale to the actual inter-atomic distances. This technique is known in the prior art and is described in the article by Andre S. Dreiding, Helv. Chim. Acta 42, 1339 (1959). The Dreiding models can be conveniently constructed from units obtained from Brinkman Instruments Inc., Cantiague Road, Westbury, N.Y. The terminal junction is the ring carbon atom of —X— that is attached to the functional group —Y— or —Z— as shown in formula (I) below or any carbon of —X— that is attached to the —Y— or —Z— group, as shown in formula XI below.

Basically, —X— is a radical made up of a chain or backbone of ring structures. The rings of the structure can be fused or not fused. When not fused, the rings are connected to each other within —X— by trans-amide, carbonyl, trans-vinylene, azo or azomethine linkages. The ring structures, which may be, but preferably are not, substituted, include

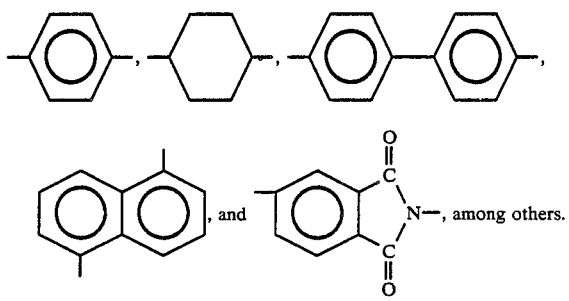

The "hard" segment is further characterized by the melting point of the dibutyl ester of the diacid

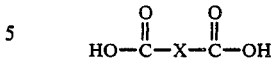

where —X— is as defined above. The present invention requires this dibutyl ester to have a melting point of at least about 225° C. measured as described below.

Dibutyl esters are prepared in a manner apparent to those skilled in the art. For example, the dibutyl esters of bis-trimellitimides are prepared by reaction of two moles of the mono-butyl ester of trimellitic anhydride with one mole of the appropiate diamine. The mono-butyl ester of trimellitic anhydrides is formed by reaction of one mole of trimellitic anhydride acid chloride with one mole of n-butanol.

Dibutyl esters of diacids based on the reaction of two moles of p-aminobenzoic acid and one mole of a dianhydride are made by reaction of two moles of the monobutyl ester of p-aminobenzoic acid and one mole of the dianhydride.

A number of —Y—X—Z— units are listed below as follows:

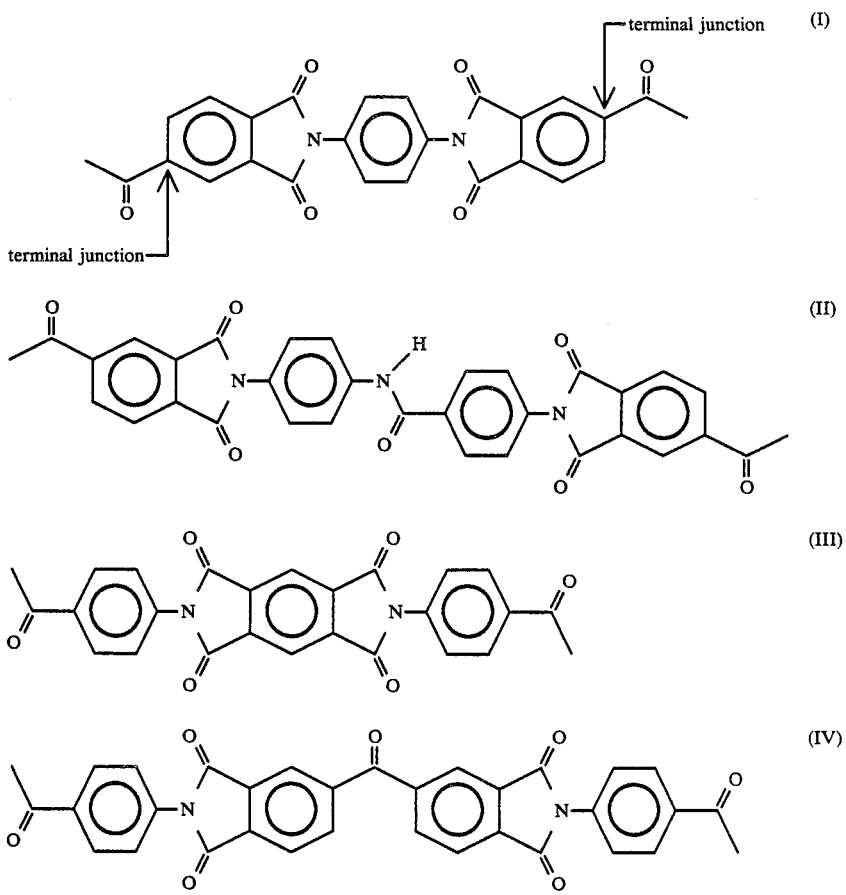

-continued
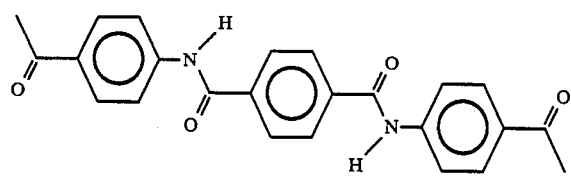
(V)
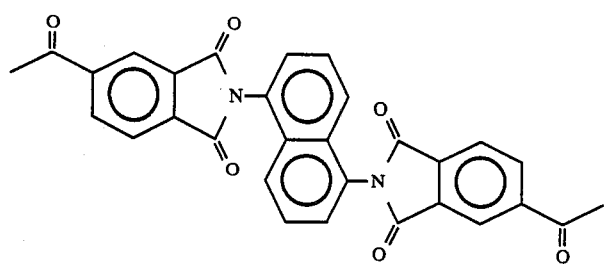
(VI)
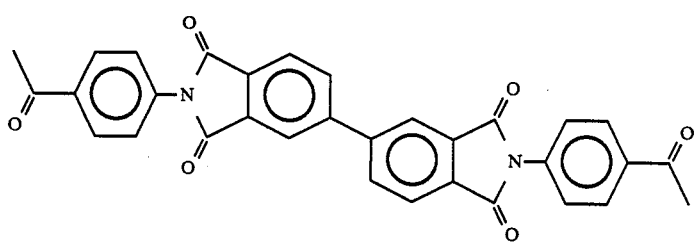
(VII)
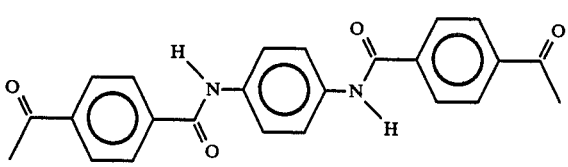
(VIII)
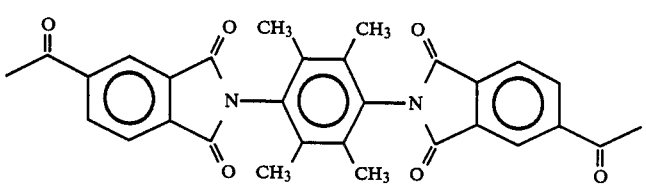
(IX)
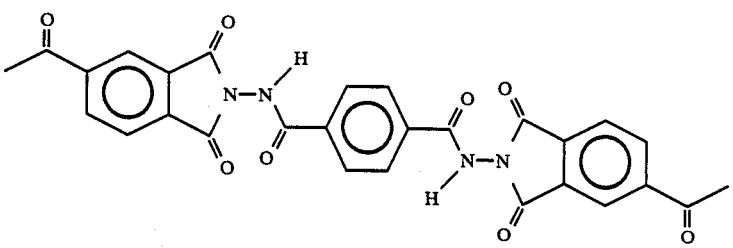
(X)
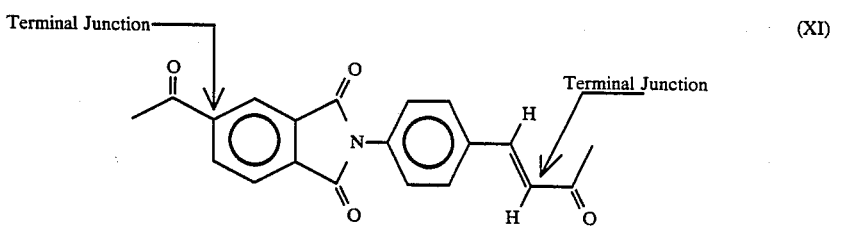
(XI)

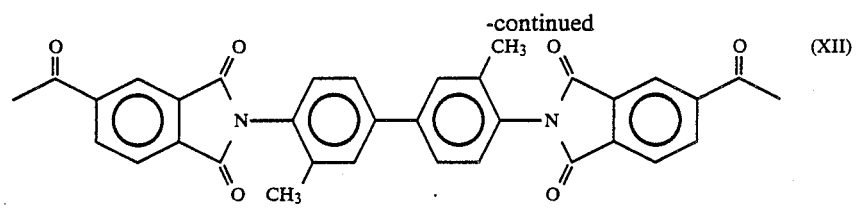
(XII)
and
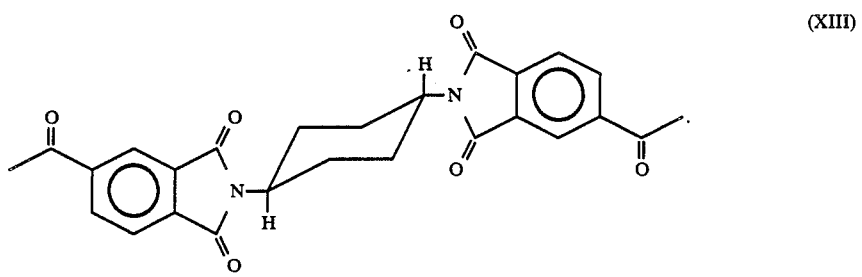
(XIII)
The following list of units also would be expected to meet the requirements for the —Y—X—Z—
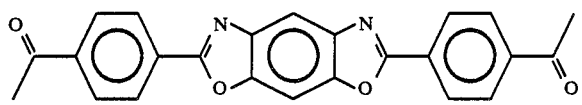
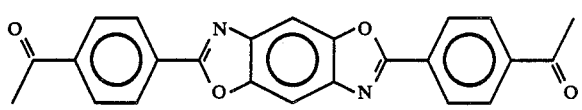
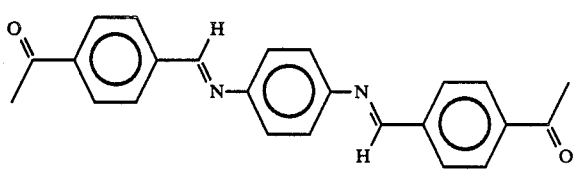
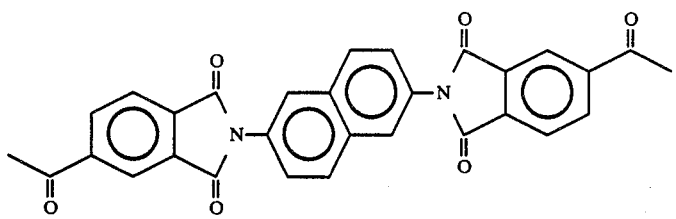
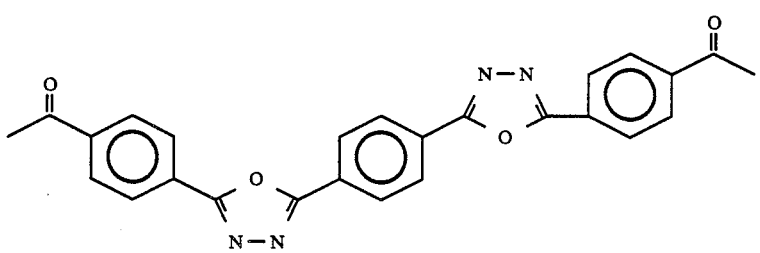
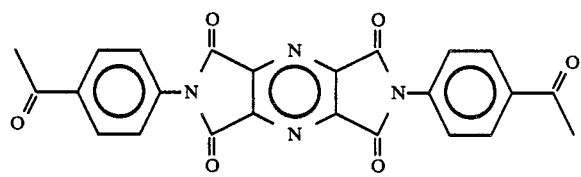

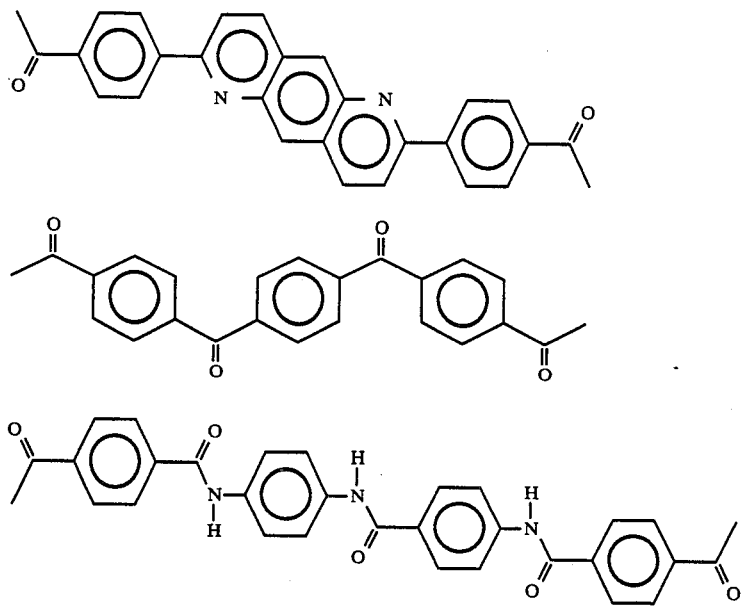

The —Y—X—Z— units are residues of diacids, diols, diamines, hydroxyacids, hydroxyamines and aminoacids. The compounds that provide the —Y—X—Z— units are referred to herein as hard segment precursors, abbreviated as "HSP". Such compounds and their preparation are described in the prior art or can be prepared by techniques well known to those skilled in the art. Preparation of compounds which provide —Y—X—Z— units is illustrated in examples which follow. A preferred synthesis procedure involves making such compounds in a polymer reaction medium of ingredients which ultimately provides the soft segment of the polymer.

In the event an —Y—X—Z— unit in diacid or diol form has an undesirably high melting point which interferes with dissolution in the reaction medium, it may be employed or formed in the form of a more soluble derivative, such as the diester in the case of the diacid. In syntheses where —X— contains a plurality of aromatic amide linkages there is a tendency for the hard segment to cleave. Care must be exercised to avoid scission under the polymerization conditions such as by use of less severe reaction conditions as by use of the aliphatic diacid(s) in the form of their dimethyl esters and by use of hindered aliphatic diol(s) such as neopentyl glycol or 1,2-propanediol.

The remainder of the elastomer composition, about 75 to 95% by weight of the polymer, is the "soft" segment. The soft segment is substantially amorphous, has a glass transition temperature below room temperature, and is made up of units (a) plus units (b) and/or (c) plus units (d), as follows:

a. 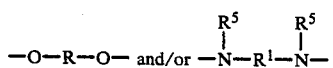

and b. 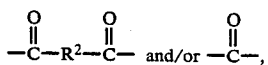

in which both free bonds are connected to oxygen and/or nitrogen, and/or c. 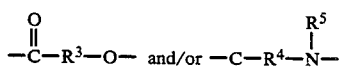

and an effective amount of d. 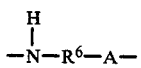

wherein the (d) units preferably amount to from 1 to 15% of the total weight of the polymer and R, $R^1$, $R^2$, $R^3$ and $R^4$ are each aliphatic divalent organic radicals, having from 2 to 15 carbon atoms within the chain, with each having a molecular weight of under 450, $R^5$ is a hydrocarbon radical, $R^6$ is a divalent aliphatic radical having 1 to 15 carbon atoms, or a divalent aromatic radical containing 1, 2 or 3 six-membered rings, the rings being non-substituted or substituted with monovalent or divalent alkyl radicals having 1 to 4 carbon atoms, provided that when the alkyl radical, of unit (d) is divalent, one of the valencies is connected to the —NH— radical or to the —A— radical, and —A— is

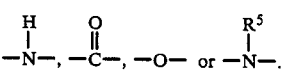

The term "aliphatic" is intended to include straight chain, branched chain and cycloaliphatic, as well as aliphatic which may be interrupted with —O—, —S—, tertiary nitrogen or may be substituted, as for example, with halogens. Preferably the aliphatic radical is a saturated hydrocarbon, although small amounts of unsaturated units, such as are derived from 2-butene-1,4-diol or maleic acid, are also permitted. The $R^5$ hydrocarbon radical preferably is a phenyl or an alkyl having 1 to 6 carbon atoms. It is expected that if halogen substituents were attached to permitted rings of $R^6$ of unit (d), the resultant polymer would be about equivalent to the same polymer having monovalent alkyl radical substituents on the rings.

The "soft" segment may include minor amounts, i.e., less than about 20% by weight of the soft segment, of units not conforming to these formulas, such as units from hydroquinone, terephthalic acid or higher molecular weight macrodiols, such as polyalkylene ether glycols or macrodiacids, such as "dimer acid", the commercially available diacid obtained by coupling of two long chain unsaturated monocarboxylic fatty acids.

The polymer of the present invention is "stoichiometrically balanced". This means, for example, that the number of moles of unit (a) is substantially equal to the sum of the moles of unit (b) plus the moles of —Y—X—Z— when both —Y— and —Z— are carbonyl groups, and the number of moles of unit (b) is substantially equal to the sum of the moles of unit (a) plus moles of —Y—X—Z— where both —Y— and —Z— are

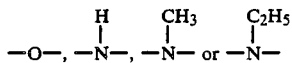

If —Y— is carbonyl and —Z— is

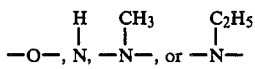

then the number of moles of unit (a), if present, will be substantially equal to the number of moles of (b). Similarly, the number of moles of unit (d) substantially equals the sum of the moles of plus the moles of unit (b) plus the moles of —Y—X—Z— when —A— of unit (d) is

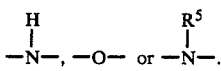

If —A— is a carbonyl radical, then the number of moles of unit (a), if present, substantially equals the number of moles of unit (b).

The unit, —O—R—O—, is the residue of a low molecular weight aliphatic diol. Included among the diols useful in this invention are ethylene glycol, 1,2-propylene glycol, 1,3-propylene glycol, 1,2-, 1,3-, and 1,4-butylene glycol, 1,6-hexanediol, neopentyl glycol and diethylene glycol. Neopentyl glycol is especially useful. Aliphatic diols having a tertiary nitrogen atom in the chain are also useful. Mixtures of the diols are often used with improved results. Minor amounts of aromatic diols may be included in a diol mixture provided they do not interfere with the desired elastomeric properties. In place of or in addition to the diols, low molecular weight diamines may be employed in the preparation of the polymer. The unit,

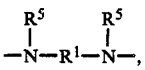

represents the residue of suitable low molecular weight aliphatic diamines. Included among such suitable compounds are N,N'-dibutylpentamethylenediamine and N,N'-dimethylhexamethylenediamine. The functional equivalents of the diols and diamines may be used in the preparation. Thus, for example, epoxides can be used in place of the dihydroxy compound, which in the case of phenylglycidyl ether is 1,2-dihydroxy-3-phenoxypropane.

The unit

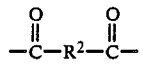

and the unit

are, respectively, residues of an aliphatic dicarboxylic acid and carbonic acid. Included among the useful acids are succinic, glutaric, adipic, azelaic, carbonic and dodecanedioic acid, as well as their functional equivalents, such as the esters, acid halides and anhydrides thereof. Adipic acid and dibasic acids having at least 7 straight-chain carbon atoms between the carboxyl atoms are particularly useful. Mixtures of acids may be used if desired. Aromatic dicarboxylic acids may be used only in minor amounts in admixture with the low molecular weight aliphatic dicarboxylic acids since larger amounts cause a substantial increase in the glass transition temperature, Tg, of the elastomer, impairing low temperature performance.

The unit,

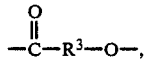

is the residue of an aliphatic hydroxyacid. Examples of such hydroxyacids include 12-hydroxystearic acid, 10-hydroxydecanoic acid and 4-hydroxycaproic acid as well as their functional equivalents, such as lactones. Mixtures of hydroxyacids may be used if desired. Hydroxyaromatic acids, such as hydroxybenzoic acid, may be used in minor amounts in admixture with the aliphatic hydroxyacids provided they do not interfere with the desired elastomeric properties. Similarly, the unit,

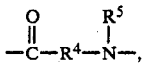

which is the residue of an aliphatic aminoacid may be present in place of or in addition to the

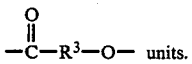 units.

One such aminoacid is N-butyl-6-aminohexanoic acid. $R^5$ is as defined above.

The unit (d),

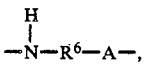

is the residue of a low molecular weight primary amine. Suitable compounds for providing the residue include diamines, such as hexamethylene diamine or trans-1,4-diaminocyclohexane, or amino alcohols, such as 3- amino-1-propanol, or amino acids, such as 11-aminoundecanoic acid, 6-aminocaproic acid, p-aminobenzoic acid, 4-methylaminobenzoic acid or 4-aminophenylacetic acid, and functional equivalents, such as ε-caprolactam and the like, or mixtures thereof.

Usually, unit (d) amounts to 1 to 15 percent of the total weight of the elastomer. The amount of unit (d) needed to be effective in improving the elastic and set properties of the elastomer depends on, among other things, the particular hard segment, the amount of hard segment and the particular other units present in the elastomer. For example, the improvement is most evident when the amount of hard segment amounts to 15 to 25 percent of the elastomer weight. Preferably, unit (d) amounts to 3 to 6% when the unit d. is the residue of a diamine or of an amino alcohol and 5 to 10% when unit (d) is the residue of an amino acid. Preferred units (d) are derived from trans-1,4-diaminocyclohexane, 3-amino-1-propanol, 11-aminoundecanoic acid and 6-aminocaproic acid.

Amorphous soft segments usually are desired for superior elastomer properties. Various techniques can be used to avoid crystallinity in the soft segment. For example, one can use a mixture of aliphatic diols with one aliphatic diacid, or a mixture of aliphatic diacids with one aliphatic diol, or N-alkyl groups in the units (a) described above.

The aforementioned units (a), (b) and (c) of the soft segment can be supplied from polyester macromolecules which revert to the diols and diacids (and oligomers thereof) from which they are formed. This reversion can occur in the course of preparation of the thermoplastic elastomer of the present invention. The aforementioned unit (d) of the soft segment can be supplied from a short segment (oligomer) of a polyamide which reverts to the amino acid or corresponding diacids and diamines or amine alcohols.

With the diester or diacid hard segment precursors described herein, the elastomers can be made conveniently by conventional esterification and/or ester interchange reactions. One procedure, for example, involves heating at about 200° to 300° C. in the presence of a catalyst, (1) the diacid that provides the hard segment, e.g., p-phenylene-bis-(N-trimellitimide) which yields (I), with (2) reactants that form the soft segment such as (i) a low molecular weight diol or mixture of diols in molar excess (ii) a low molecular weight aliphatic diacid or mixture of diacids, and (iii) ingredients that yield primary amine units (units (d)). Heating is continued until all the water formed by the esterification reaction is distilled off. The heating can require a few minutes or a few hours, depending on the particular reactions taking place. As a result of this procedure a low molecular weight prepolymer is prepared which can then be formed into a high molecular weight copolyester by the procedure described below. If the dimethyl ester of the low molecular weight aliphatic diacid is used in place of the free acid, methanol is evolved instead of water. Also, anhydrides or acid chlorides can be used with or instead of the diacids. Alternatively, the prepolymer can be prepared from the free acids with diacetates of the aliphatic diols (in which case, acetic acid is removed by distillation), or with "ethylene oxide type" cyclic ethers or with carbonates. If desired, an ester interchange can be performed, for example, by reacting the diacid which provides the hard segment with a high or low molecular weight ester homopolymer or copolymer in the presence of catalyst until randomization occurs. A small amount of low molecular weight aliphatic diacid or diol can be added for stoichiometric balance, if needed.

In another alternative process for preparing an elastomer of the invention, the precursors of the high molecular weight diacid and one or more diols providing unit (a) are first formed into a slurry after which a catalyst and one or more diacids providing unit (b) and one or more primary amine compounds providing unit (d) are added. The resultant mixture is then heated to form the prepolymer.

The molecular weight of the prepolymer is increased by distilling off the excess diol along with evolved water or methanol. Further esterification and/or ester interchange occurs during the distillation, which causes the molecular weight to increase and the arrangement of the copolyester units to be random. Usually, superior results are obtained when the final distillation or polycondensation is performed at a pressure of less than 5 mm and a temperature in the range of 250° to 300° C. for less than 4 hours in the presence of antioxidants such as N,N'-hexamethylene-bis(3,5-di-tert-butyl-4-hydroxyhydrocinnamamide). To avoid excessive time periods at high temperatures, with possible accompanying irreversible thermal degradation, it is advantageous to employ a catalyst for the esterification and/or ester interchange reactions. A wide variety of catalysts can be used. Organic titanates, such as tetrabutyl titanate (TBT), used alone or in combination with magnesium or calcium acetates, are preferred when ester interchange is the sole mechanism of polymerization. Inorganic titanates such as lanthanum titanate, calcium acetate/antimony trioxide mixtures and lithium and magnesium alkoxides are representative of other suitable catalysts. When direct esterification bbetween diols and diacids) is employed in the presence of compounds providing primary amine units (d), antimony trioxide is the preferred catalyst.

The esterifications or ester-interchanges usually are perfomed in the melt without added solvent, though inert solvents can be used to facilitate removal of volatile components at lower temperatures. This technique is especially valuable during preparation of prepolymer by direct esterification. However, certain low molecular weight diols (e.g., butanediol) can be conveniently distilled off during polymerization. Batch and/or continuous methods can be used for the various stages of the copolyester polymer preparation. Polycondensation of prepolymer can also be accomplished in the solid phase by heating finely divided solid prepolymer in a vacuum or in a stream of inert gas to remove low molecular weight products.

The elastomers of this invention possess many desirable properties. However, it is sometimes advisable to protect certain of the compositions against heat or radiation by ultra-violet light by incorporating stabilizers in the elastomer. Satisfactory stabilizers include phenols and their derivatives, amines and their derivatives, compounds containing both hydroxyl and amine groups, hydroxyazines, oximes, polymeric phenolic esters and salts of multivalent metals in which the metal is in its lower valence state. Among such phenol derivatives are 4,4'-bis-(2,6-ditertiary butylphenol) and 1,3,5-trimethyl-2,4,6-tris-(3,5-ditertiarybutyl-4-hydroxybenzyl)benzene ("AO-330", sold by Ethyl Corp., Baton Rouge, La.). Also suitable are various inorganic metal salts or hydroxides and organic complexes, such as nickel dibutyldithio-carbamate, manganous salicylate and copper 3-phenyl-salicylate. Suitable amine stabilizers include N,N'-bis(β-naphthyl)-p-phenylenediamine, N,N'-bis(1-methylheptyl)-p-phenylenediamine and either phenylbetanaphthylamine or its reaction products with aldehydes. Mixtures of hindered phenols with esters of thiodipropionic acid, mercaptides and phosphite esters are particularly useful. Additional stabilization to ultraviolet light can be obtained by incorporating various UV absorbers, such as substituted piperidyl derivatives, substituted benzophenones or substituted benzotriazoles.

Sometimes, branching agents are incorporated, at a concentration of 0.001 to 0.005 equivalents per 100 g of polymer, to increase melt strength, as disclosed in for example, U.S. Pat. No. 4,013,624 and 4,205,158. Suitable branching agents include polyols having 3 to 6 hydroxyl groups, polycarboxylic acids having 3 or 4 carboxyl groups or hydroxy acids having a total of 3 to 6 hydroxyl and carboxyl groups. Among such polyols are glycerol, trimethylol propane, 1,2,6-hexanetriol, 1,1,4,4-tetrakis(hydroxymethyl)cyclohexane, sorbitol, and pentaerythritol. Suitable polycarboxylic acid branching agents include hemimellitic acid, trimellitic acid, trimesic acid, 1,1,2,2-ethanetetracarboxylic acid, pyromellitic acid, 1,1,2-ethanetricarboxylic acid, 1,2,3,4-cyclopentanetetracarboxylic acid, and 1,3,5-pentanetricarboxylic acid. Although the acids can be used as such, preferably they are used in the form of their lower alkyl esters.

Properties of the elastomers of the invention can be modified by incorporation of various conventional inorganic fillers, such as carbon black, silica gel, alumina, clays and reenforcing fiber (e.g.,glass). Usually, these additives increase the elastomer modulus at various elongations. The desired hardness of the elastomer can be obtained by blending elastomers of the invention having different percentages of hard and soft segments.

A method for improving the tenacity and set of fibers or films made from these polymers comprises heating the fibers or films for at least two hours at temperatures of at least 150° C. in an inert atmosphere (as disclosed in U.S. Pat. No. 3,801,547). If desired, slight or moderate tension can be applied during heating. Excessively long heating periods and excessively high temperatures should be avoided to prevent deterioration of the polymer or of the fiber or film made from the polymer.

The elastomers of the invention which contain effective amounts of primary amine units (d) in its soft segments, compared to elastomers of like composition that do not contain such units (d), can form tapes and filaments with significantly improved properties. For example, elastomers containing such primary amine units can provide tapes or filaments which exhibit 50% less set, 50-100% higher break elongation, and easier processability. The improvements are particularly evident in elastomers of the invention that contain high percentages of hard segments in the elastomer (e.g., 15-25% of total polymer weight). Such elastomers provide tapes or filaments with increases of as much as 100% in tenacity and 50-75% in unload power, with little reduction in break elongation. For elastomers of the invention containing such high contents of hard segments, it is preferred that the molar ratio of soft segment primary amine units (d) to hard segment (A) units be in the range of 0.1 to 1.6, most preferably 0.5 to 1.1. When smaller percentages of hard segment are in the elastomer, the preferred molar ratio of primary amine units to hard segment is less than 1.0.

Test Procedures

Inherent viscosity, in deciliters per gram (dL/g), is measured in accordance with W. R. Sorenson and T. W. Campbell, "Preparative Methods of Polymer Chemistry", Interscience, 2nd Ed. (1968) p. 44, on a solution of 0.5 gram of polymer in 100 ml of m-cresol at 30° C. (unless the polymer is insoluble).

Melting point, unless indicated otherwise, is measured with a Du Pont Model 9900-Differential Scanning Calorimeter (DSC) in accordance with B. Wunderlich, "Thermal Analysis", published by Rensselaer Polytechnic Institute (1981), and is defined as the temperature at the lowest point of the endotherm of transition to an isotropic melt.

Tenacity at break, T, in grams per denier (gpd) and percent elongation at break, E, are measured in accordance with ASTM Method D 2653-72, "Standard Test Method for Breaking Load and Elongation of Elastomeric Yarns."

The % set was measured in accordance the method of ASTM Method D 2731-72, "Standard Test Method for Elastic Properties of Elastomeric Yarns. "Unload power", in grams per effective denier (g/eff den), also is measured in accordance with the general method of ASTM D 2731-72. Three filaments, a 2-inch (2.5-cm) gauge length and a 0-to-300% elongation cycle are used for each determination. Unload power (i.e., the stress at a specific elongation) is measured after the samples have been cycled five times at a constant elongation rate of 1,000% per minute and then held at the 300% extension for half a minute after the fifth extension. Then, while unloading from this last extension, stess is measured and reported in g/eff den at 100% elongation.

The examples which follow illustrate the present invention and are not intended to limit its scope, which is defined by the claims.

In the examples, each sample of the invention is designated with an arabic numeral and each comparison sample is desgnated with a lower case letter. Diacids and elastomers formed therewith were prepared by the following methods. The diacid providing radical (I) was used in each example. Other diacids suitable for use in elastomers of the invention, their preparation and polymerization with other suitable ingredients providing units (a), (b) and (c), and the elastomers made therefrom, are disclosed in Examples 2–9, 12–16 and 18–38 of U.S. patent application Ser. No. 927,087, filed Nov. 10, 1986, which disclosure is hereby incorporated by reference. When the examples below are repeated with these other suitable ingredients, the advantageous effects shown below for including primary amine units (d) in the soft segment of the elastomer are also evident in these other elastomers of the invention.

Preparation of Diacid

The diacid, p-phenylene-bis-(N-trimellitimide), was synthesized by adding 54 g of p-phenylenediamine in 200 cc of anhydrous N,N-dimethylformamide (DMF) to a solution of 192 g of trimellitic anhydride in 500 cc anhydrous DMF, under reflux conditions. After 2 hours of reflux and cooling, the resultant material was filtered and dried in a vacuum oven at 110° C. to remove solvent. The yield was 191 g. A portion recrystallized from DMF had a DSC melting point of 455° C. The di-n-butyl ester of this diacid was synthesized and exhibited an nmr spectrum consistent with the attributed structure. DSC melting point of the ester was 274.8° C. The size of the group "X" in the diacid which provides radical (I) defined above, as measured from a Dreiding model laid flat in its shortest conformation, was 15 Angstroms. The shortest conformation is with the carboxyl carbonyls positioned cis to one another.

Preparation of Elastomer

In each of the examples below, polymerization was performed in a 350-mL kettle that was equipped with a mechanical stirrer, a nitrogen inlet, a Wood's metal heating bath and a vacuum distillation column. After the desired ingredients were placed in the kettle, the kettle was purged with nitrogen and placed in the bath, which was maintained at a temperature of 220° C. The ingredients were stirred rapidly for 45 minutes. The bath temperature was then raised and maintained at 280°–285° C., while rapid stirring was continued, for about 1–2 hours, until a homogeneous melt was obtained. Then, temperature was reduced to about 270° C. and pressure inside the kettle was reduced to 0.50–0.25 mm Hg over the course of about 1.5 hours. Stirring was continued for about 20 minutes until a viscous melt was obtained. The molten polymer was then removed from the kettle.

EXAMPLE I

This example illustrates including preferred primary amine radicals (units (d)) in elastomers of the invention. In preparing the elastomer, primary amine radicals were provided by: in Sample 1, a diamine, trans-1,4-diaminocyclohexane; in Sample 2, an amino-acid, 6-aminocaproic acid; and in Sample 3, an amino-alcohol, 3-amino-1-propanol. Table I lists the identity and amount of each ingredient loaded into the polymerization kettle, the yield of elastomer, its inherent viscosity, the temperature at which it was extruded into thin strip and then wound up at 15 m/min, and the physical properties of the extruded strip.

TABLE I

|  |  | Example I | | |
|---|---|---|---|---|
|  |  | Sample 1 | Sample 2 | Sample 3 |
| Ingredients[1] | | | | |
| HSP[2] | grams | 18.44 | 18.50 | 18.52 |
|  | mol | 0.0404 | 0.0406 | 0.0406 |
| Primary amine[3] | grams | 2.72 | 4.64 | 2.67 |
|  | mol | 0.0238 | 0.0354 | 0.0356 |
| Adipic acid | grams | 47.48 | 44.68 | 48.05 |
|  | mol | 0.325 | 0.306 | 0.329 |
| Ethylene glycol | grams | 20.00 | 20.00 | 20.00 |
|  | mol | 0.3226 | 0.3226 | 0.3226 |
| 1,4-butane diol | grams | 10.89 | 12.65 | 10.69 |
|  | mol | 0.1210 | 0.1406 | 0.1188 |
| Resultant Elastomer | | | | |
| Yield, grams | | 62.8 | 69.4 | 69.0 |
| Viscosity, $\mu_{inh}$, dL/g | | 0.90 | 0.92 | 0.98 |
| % -X-[4] | | 18.6 | 18.6 | 18.6 |
| % amine units[4] | | 3.4 | 5.0 | 3.2 |
| Extrusion Temp., °C. | | 197 | 211 | 207 |
| Strip Properties | | | | |
| $T_b$, Tenacity, g/den | | 0.23 | 0.16 | 0.11 |
| $E_b$, Elongation, % | | 636 | 827 | 556 |
| UP, Power, g/eff den | | 0.79 | 0.87 | 0.78 |
| Set, % | | 39.4 | 43.7 | 44.9 |

Notes:
[1]Also included are 0.3 gram of Ethyl Antioxidant 330 and 4 mL of a 1% solution of antimony trioxide in ethylene glycol.
[2]HSP is p-phenylene-N,N'—bis-trimellitimide.
[3]The primary amine ingredient is: trans-1,4-diaminocyclohexane for Sample 1, 6-aminocaproic acid for Sample 2 and 3-amino-1-propanol for Sample 3.
[4]% -X- (i.e., hard segment) and % amine units are by total weight of elastomer.

EXAMPLE II

This example compares strip properties of elastomers of the invention containing various amounts of primary amine units in their soft segments (Samples 4, 5 and 6) with those of like elastomers that do not contain such amine units (Comparisons a, b and c). The strips were extruded and wound up substantially as described in Example I. When present, the primary amine units amounted to 5% by total weight of the elastomer and were provided by 11-aminoundecanoic acid which was included in the ingredients used for preparing the elastomers. Table II shows that the elastomers with the primary amine units have lower set, higher unload power, and higher break elongation.

TABLE II

|  | Example II | | | | | |
|---|---|---|---|---|---|---|
| Sample | 4 | a | 5 | b | 6 | c |
| Ingredients[1] | | | | | | |
| HSP | 11.03 | 11.35 | 14.80 | 14.80 | 18.50 | 18.50 |
| amine | 4.39 | 0 | 4.39 | 0 | 4.39 | 0 |
| acid | 50.24 | 49.44 | 47.87 | 51.06 | 44.68 | 47.87 |
| 2G | 17 | 20 | 20 | 20 | 20 | 20 |
| 4G | 17 | 20 | 13.15 | 13.94 | 12.65 | 13.45 |
| Elastomer[2] | | | | | | |
| $\mu_{inh}$ | 0.92 | 1.36 | 1.20 | 1.08 | 0.87 | 1.08 |
| % -X- HS | 11.1 | 11.1 | 14.8 | 14.8 | 18.6 | 18.6 |
| % amine | 5 | 0 | 5 | 0 | 5 | 0 |
| Strip | | | | | | |
| $T_b$ | 0.08 | 0.08 | 0.11 | 0.06 | 0.15 | 0.07 |
| $E_b$ | 896 | 412 | 392 | 291 | 728 | 447 |
| UP | 0.94 | 0.57 | 0.87 | 0.15 | 0.77 | 0.02 |
| Set | 31.5 | 59.7 | 45.1 | 79.5 | 66.1 | 104.4 |

Notes to Table II:
[1]Weight of each ingredient is in grams. The ingredients are:
HSP = p-phenylene-N,N'—bis-trimellitimide
amine = 11-aminoundecanoic acid
acid = adipic acid
2G = ethylene glycol
4G = 1,4-butane diol
[2]See Table I for units of various parameters concerning the elastomer and properties of extruded strip. HS = hard segment. % amine refers to the primary amine units in the elastomer.

EXAMPLE III

This example illustrates the effect of amine concentration in elastomers of the invention. The procedures of Example II were repeated with ingredients that provided a range of 0 to 20 weight percent of amine units in the final elastomer and an elastomer having 18.6% by weight —X— hard segment. The primary amine units are provided by 11-aminoundecanoic acid. Each of the elastomer preparations of this Example, included 18.50 grams of HSP (p-phenylene-N,N'-bis-trimellitimide) and 20 grams of ethylene glycol. The results of the procedures and the properties of the resultant elastomer strips are summarized in Table III. The elastomer of Comparison c of Example II, which also contains 18.6% hard segment but no amine units, is included in Table III. Sample 6, also is repeated from Example II.

The results show that with two weight percent of amine units in the elastomers of the invention, or even less, the properties of strips prepared from the elastomers are improved significantly in break elongation, unload power and set, as compared to the elastomer strips having no amine units in the soft segment. Tenacity of the strips also is improved. However, 20% primary amine units in the elastomer caused the elastomer to be too sticky to extrude.

TABLE III

| | Example III | | | | | |
|---|---|---|---|---|---|---|
| Sample | c | 7 | 8 | 6 | 9 | 10 |
| Ingredients[1] | | | | | | |
| amine | 0 | 1.76 | 2.64 | 4.39 | 8.79 | 13.18 |
| acid | 47.87 | 46.59 | 45.95 | 44.68 | 41.49 | 38.29 |
| 4G | 13.45 | 13.13 | 12.97 | 12.65 | 11.85 | 11.05 |
| Elastomer[2] | | | | | | |
| % amine | 0 | 2 | 3 | 5 | 10 | 15 |
| Strip | | | | | | |
| $T_b$ | 0.07 | 0.10 | 0.08 | 0.15 | 0.14 | 0.08 |
| $E_b$ | 447 | 956 | 570 | 728 | 677 | 727 |
| UP | 0.02 | 0.07 | 0.15 | 0.68 | 0.56 | 0.87 |
| Set | 104.4 | 82.6 | 83.3 | 66.1 | 46.2 | 24.6 |

Notes: See notes of Table II.

EXAMPLE IV

Example III was repeated to form an elastomer that contained, based on total elastomer weight, 18.6% —X— hard segment and 5% primary amine radicals derived from the following amino-acids:

| Sample 11 | glycine |
|---|---|
| Sample 12 | alanine |
| Sample 13 | 4-aminobutyric acid |
| Sample 14 | 5-aminovaleric acid |
| Sample 15 | para-aminobenzoic acid |
| Sample 16 | 4-aminophenylacetic acid |
| Sample 17 | 4-methylaminobenzoic acid |

In making each of the elastomers, 18.50 grams of HSP (p-pheylene-N,N'-bis-trimellitimide), 44.68 grams of amipic acid, 12.65 grams of 1,4-butane diol and 20 grams of ethylene glycol, plus the usual other ingredients and the amount of amino acid listed in Table IV were employed. The physical properties of strip made from the elastomers are summarize in Table IV.

TABLE IV

| | Example IV | | | | | | |
|---|---|---|---|---|---|---|---|
| Sample | 11 | 12 | 13 | 14 | 15 | 16 | 17 |
| Amine, grams | 5.26 | 5.01 | 4.85 | 4.73 | 4.60 | 4.54 | 4.54 |
| Strip | | | | | | | |
| $T_b$ | 0.06 | 0.05 | 0.10 | 0.06 | 0.13 | 0.11 | 0.11 |
| $E_b$ | 502 | 239 | 835 | 607 | 820 | 794 | 510 |
| UP | 0.48 | 0.36 | 0.40 | 0.14 | 0.20 | 0.28 | 0.69 |
| Set | 41.2 | 43.5 | 59.6 | 71.7 | 69.9 | 78.1 | 47.0 |

Notes: See notes of Table II.

We claim:

1. An elastomer consisting essentially of
   A. 5 to 25 weight percent of —X— units where —X— is part of a repeat unit having the structural formula

—Y—X—Z— where —Y— and —Z— are independently selected from

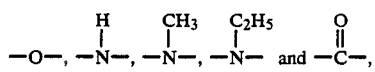

—X— is a divalent organic radical consisting of a chain of ring structures except for trans-amide, carbonyl, trans-vinylene, azo, and azomethine linkages which may be present and whose shortest length between centers of its terminal junctions measured from a Dreiding model laid flat is at least 11 Angstroms; amd when —X— is in the compound:

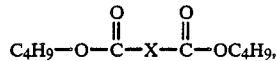

the compound exhibits a melting point that is at least about 225° C. and

B. at least 75 weight % of units selected from the following

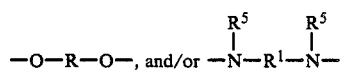

and

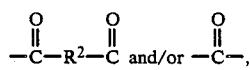

in which both free bonds are connected to oxygen and/or nitrogen and/or

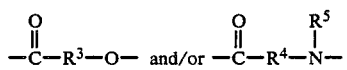

and an effective amount of

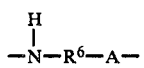

wherein R, R[1], R[2], R[3] and R[4] are each aliphatic divalent organic radicals, having from 2 to 15 carbon atoms within the chain, with each having a molecular weight of less than 450, R[5] is a hydrocarbon radical, R[6] is a divalent aliphatic or cycloaliphatic radical having 1 to 15 carbon atoms, or a divalent aromatic radical containing 1, 2 or 3 six-membered rings, the rings being non-substituted or substituted with monovalent or divalent alkyl radicals having 1 to 4 carbon atoms, provided that when the alkyl is divalent, one of the valencies is connected to the —NH— radical or to the —A— radical and —A— is

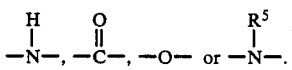

2. An elastomer according to claim 1 wherein —Y—X—Z— is selected from the group consisting of

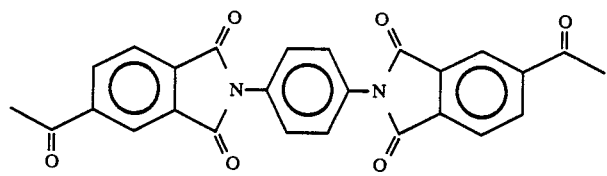 (I)
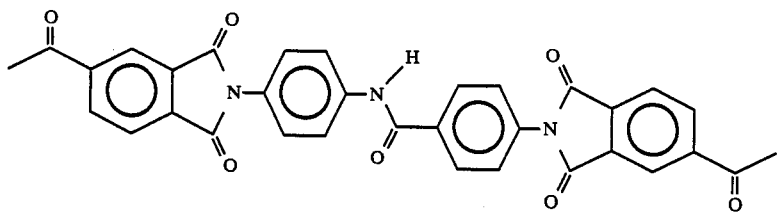 (II)
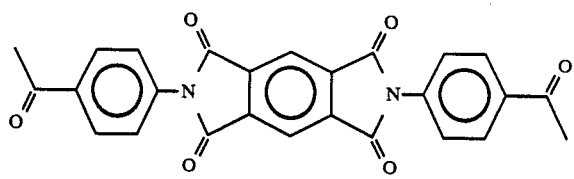 (III)
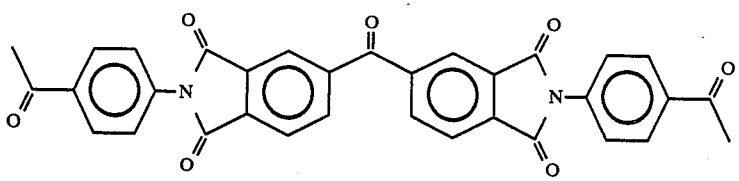 (IV)
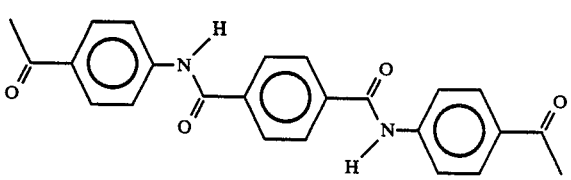 (V)
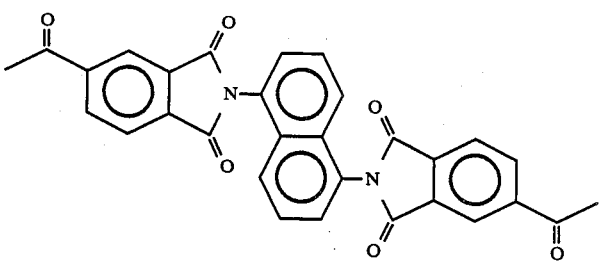 (VI)
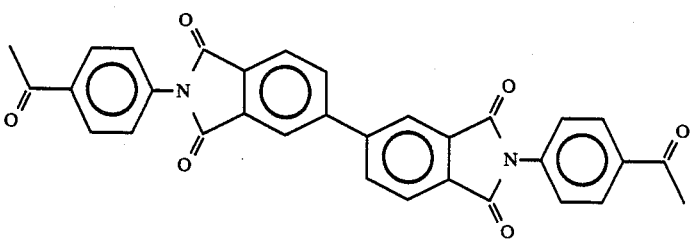 (VII)
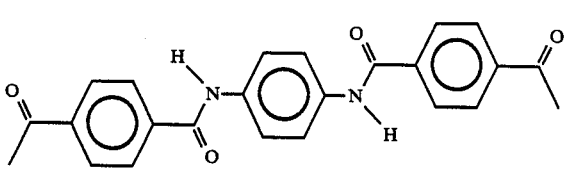 (VIII)

-continued

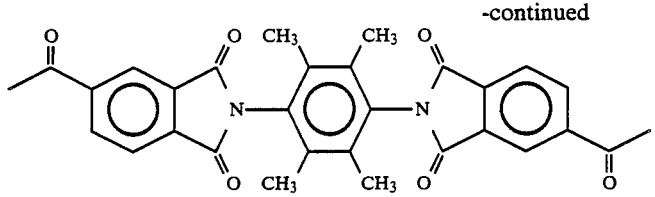 (IX)

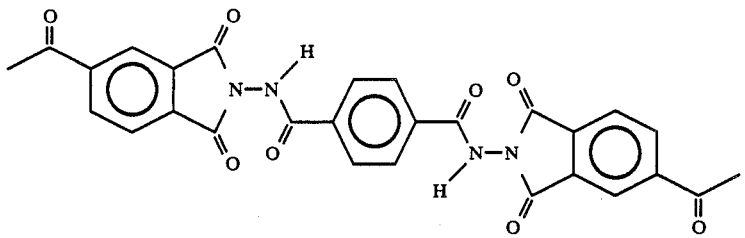 (X)

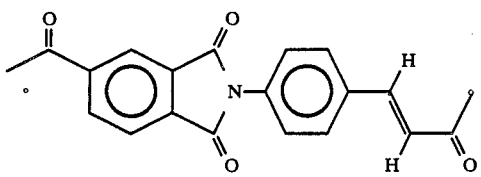 (XI)

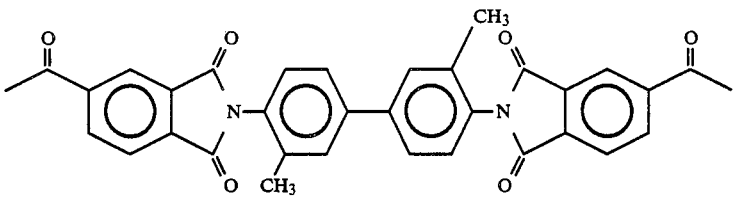 (XII)

and

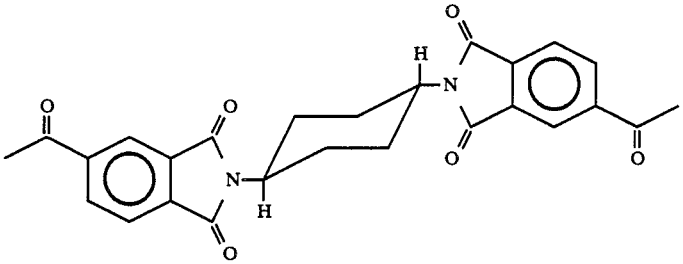 (XIII)

3. An elastomer according to claim 1 or 2 wherein the primary amine units (d) amount to 1 to 15 weight percent.

4. An elastomer according to claim 1, 2 or 3 wherein the —X— units amount to 15 to 25 percent.

5. An elastomer according to claim 1, 2 or 4 wherein the (d) units are residues of diamines and amount to 3 to 6 percent by weight of the elastomer.

6. An elastomer according to claim 1, 2 or 4 wherein the (d) units are residues of amino alcohols and amount to 3 to 6 percent by weight of the elastomer.

7. An elastomer according to claim 1, 2 or 4 wherein the (d) units are residues of amino acids and amount to 5 to 10 percent by weight of the elastomer.

8. An elastomer according to claim 5 wherein the diamine is trans-1,4-diaminocyclohexane.

9. An elastomer according to claim 6 wherein the amino alcohol is 3-amino-1-propanol.

10. An elastomer according to claim 7 wherein the amino acid is selected from the group consisting of 11-aminoundecanoic acid and 6-aminocaproic acid.

11. An elastomer according to claim 1 wherein the (a) units are residues of neopentyl glycol and the (b) units are residues of dibasic acids having at least 7 straight-chain carbon atoms between carboxyl groups.

12. A fiber, film or molded article of the elastomer of claim 1.

13. A method of improving the tenacity and set of fibers or films from the elastomers of claim 1 comprising heating the fibers or films for at least two hours at a temperature of at least 150° C. under an inert atmosphere.

14. A process for preparing an elastomer of claim 1 which comprises heating, at a temperature of about 200° to 300° C. in the presence of an esterification catalyst, a high molecular weight diacid of the formula

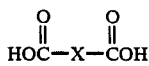

where —X— is as defined in claim 1 with one or more diols, diacids and primary amine-containing ingredients that provide unit (a), (b) and (d) of claim 1, said diols being in excess of stoichiometry, to form prepolymer and then extending prepolymer to high molecular weight.

15. A process according to claim 14 wherein the high molecular weight diacid is p-phenylene-bis-(N-trimellitimide).

16. A process according to claim 14 wherein the high molecular weight diacid is first formed as a slurry in one or more esters of diacids providing unit (b) after which catalyst and one or more of the diols providing unit (a) and one or more amine-containing compounds providing unit (d), are added and the mixture heated to form the prepolymer.

17. A process for preparing an elastomer of claim 1 wherein the precursors of the high molecular weight diacid and one or more diols providing unit (a) are first formed into a slurry, after which a catalyst, one or more diacids providing unit (b), and one or more amine-containing compounds providing units (d) are added and the mixture is heated to form the prepolymer, which is then increased in molecular weight.

18. A process according to claim 17 wherein the slurry formation is carried out at room temperature.

* * * * *